United States Patent [19]

Thomas et al.

[11] Patent Number: 4,900,463

[45] Date of Patent: Feb. 13, 1990

[54] REFRIGERATION LUBRICANT BLENDS

[75] Inventors: Raymond H. P. Thomas, Amherst; Hillel Magid, Buffalo; David P. Wilson, Williamsville; John W. Pelava, Buffalo, all of N.Y.

[73] Assignee: Allied-Signal Inc., Morris Township, Morris County, N.J.

[21] Appl. No.: 355,951

[22] Filed: May 23, 1989

[51] Int. Cl.$^4$ .......................................... C01M 129/04
[52] U.S. Cl. .................... 252/54; 252/52 R; 252/58; 252/68
[58] Field of Search .......... 252/52 R, 54, 58

[56] References Cited

U.S. PATENT DOCUMENTS

| | | | |
|---|---|---|---|
| 4,267,064 | 5/1981 | Sasaki | 252/52 A |
| 4,302,343 | 11/1981 | Carswell | 252/33 |
| 4,428,854 | 1/1984 | Enjo | 252/67 |
| 4,431,557 | 2/1984 | Shimizu | 252/52 A |
| 4,454,052 | 6/1984 | Shoji | 252/68 |
| 4,755,316 | 7/1988 | Magid | 252/52 A X |

FOREIGN PATENT DOCUMENTS

| | | |
|---|---|---|
| 2750980 | 5/1979 | Fed. Rep. of Germany . |
| 51795 | 3/1982 | Japan . |
| 179899 | 10/1984 | Japan . |
| 96684 | 5/1985 | Japan . |

OTHER PUBLICATIONS

Fundamental of Lubrication in Refrigeration Systems and Heat Pumps, *ASHRAE TRANSACTIONS* 90(2B) 763 (1984).
Evaluation of Lubricants for Refrigeration and Air--Conditioning Compressors, *ASHRAE TRANSACTIONS* 90(2B) 784 (1984).
1980 ASHRAE Systems Handbook, Chapter 32.
Research Disclosure 17463, Oct. 1978 by DuPont.

*Primary Examiner*—William R. Dixon, Jr.
*Assistant Examiner*—James M. Hunter, Jr.
*Attorney, Agent, or Firm*—Melanie L. Brown; Jay P. Friedenson

[57] ABSTRACT

The present invention provides a lubricating composition. The composition comprises a single phase blend of (i) at least one polyoxyalkylene glycol which has a molecular weight between 300 and 2000, a viscosity of about 10–157 centistokes at 37° C., and a viscosity index of at least 20 and (ii) a chlorotrifluoroethylene oil having a viscosity of about 0.8–1000 centistokes at 25° C. The blend is miscible in combination with the tetrafluoroethane in the range between 0° C. and at least +5° C.

22 Claims, No Drawings

REFRIGERATION LUBRICANT BLENDS

BACKGROUND OF THE INVENTION

The present invention relates to lubricant blends used with refrigerants. More particularly, the present invention relates to lubricants for use with tetrafluoroethane, and preferably, 1,1,1,2-tetrafluoroethane (known in the art as R134a). R134a is a refrigerant which may replace dichlorodifluoromethane (known in the art as R12) in many applications because environmental concerns over the use of R12 exist.

R134a has been mentioned as a possible replacement for R12 because concern over potential depletion of the ozone layer exists. R12 is used in closed loop refrigeration systems; many of these systems are automotive air-conditioning systems. R134a has properties similar to those of R12 so that it is possible to substitute R134a for R12 with minimal changes in equipment being required. The symmetrical isomer of R134a is 1,1,2,2-tetrafluoroethane (known in the art as R134); the isomer is similar in properties also and may also be used. Consequently, it should be understood that in the following discussion, "tetrafluoroethane" will refer to both R134 and R134a.

A unique problem arises in such a substitution. Refrigeration systems which use R-12 generally use mineral oils to lubricate the compressor; (the present discussion does not apply to absorption refrigeration equipment). See for example the discussion in Chapter 32 of the 1980 ASHRAE Systems Handbook. R-12 is completely miscible with such oils throughout the entire range of refrigeration system temperatures, which may range from about −45.6° to 65.6° C. Consequently, oil which dissolves in the refrigerant travels around the refrigeration loop and generally returns with the refrigerant to the compressor. The oil does not separate during condensation, although it may accumulate because low temperatures exist when the refrigerant is evaporated. At the same time, the oil which lubricates the compressor contains some refrigerant which may affect its lubricating property.

R134a is not miscible with mineral oils; consequently, different lubricants will be required for use with R134a. However, as mentioned above, no changes to equipment should be necessary when the refrigerant substitution is made. If the lubricant separates from the refrigerant, it is expected that serious operating problems could result. For example, the compressor could be inadequately lubricated if refrigerant replaces the lubricant. Significant problems in other equipment also could result if a lubricant phase separates from the refrigerant during condensation, expansion, or evaporation. These problems are expected to be most serious in automotive air-conditioning systems because the compressors are not separately lubricated and a mixture of refrigerant and lubricant circulates throughout the entire system.

These problems have been recognized generally in the refrigeration art. Two recent publications by ASHRAE suggest that separation of lubricants and refrigerants presents problems, although no mention is made of R134a. These articles are Kruse et al., "Fundamentals of Lubrication in Refrigeration Systems and Heat Pumps," *ASHRAE TRANSACTIONS* 90(2B), 763 (1984) and Spauschus, "Evaluation of Lubricants for Refrigeration and Air-Conditioning Compressors," ibid, 784.

The following discussion will be more readily understood if the mutual solubility of refrigerants and various lubricating oils is considered in general, with specific reference to R134a. Small amounts of lubricants may be soluble in R134a over a wide range of temperatures, but as the concentration of the lubricant increases, the temperature range over which complete miscibility occurs, i.e., only one liquid phase is present, narrows substantially. For any composition, two consolute temperatures, i.e., a lower and a higher temperature may exist. That is, a relatively low temperature below which two distinct liquid phases are present and above which the two phases become miscible and a higher temperature at which the single phase disappears and two phases appear again may exist. A diagram of such a system for R502 refrigerant is shown as FIG. 2 in the Kruse et al. paper mentioned above. A range of temperatures where one phase is present exists and while it would be desirable that a refrigeration system operate within such a range, it has been found that for typical compositions, the miscible range of lubricants with R134a is not wide enough to encompass the typical refrigeration temperatures.

Some disclosures which are concerned with the choice of lubricants when R134a is used as a refrigerant exist. Polyalkylene glycols were suggested to be used in Research Disclosure 17463, October 1978 by DuPont. Specific reference was made to such oils produced by Union Carbide Corporation under the trade names "ULCON" (sic) LB-165 and UCON 525. It is stated that these oils are miscible in all proportions with R134a at temperatures at least as low as −50° C. It is believed that "ULCON" (sic) LB-165 and UCON 524 are polyoxypropylene glycols which have a hydroxy group at one end of each molecule and a n-butyl group at the other end.

U.S. Pat. No. 4,302,343 teaches synthetic lubricants comprising esters of hindered polyhydric alcohols with alkanoic acids and polyether polyols; the reference teaches that the lubricants are useful in reciprocating air compressors. Related U.S. Pat. No. 4,751,012 teaches synthetic lubricants comprising esters of monohydric alcohols with aromatic or alkane dicarboxylic acids and polyether polyols.

U.S. Pat. No. 4,428,854 discloses the use of R134a as an absorption refrigerant where organic solvents are used as absorbing agents Tetramethylene glycol dimethyl ether, which is mentioned and has a low molecular weight, is not expected to be useful as a lubricant in compression refrigeration systems.

A related patent, U.S. Pat. No. 4,454,052, also discloses polyethylene glycol methyl ether used as an absorbent along with certain stabilizing materials.

German Unexamined Pat. No. Application 27 50 980 dated May 17, 1979 describes lubricants for refrigeration machines and addresses the problems of suitable lubrication at low-temperatures. The lubricants are fluorosiloxanes. Chlorotrifluoromethane (known in the art as R13) is the only refrigerant mentioned.

U.S. Pat. No. 4,267,064 also recommends the use of polyglycol oils, particularly for rotary compressors. It is indicated that viscosities in the range of 25–50 centistokes (CS) at 98.9° C. are needed plus a viscosity index greater than 150. Many refrigerants are mentioned but not tetrafluoroethane.

Japanese published application No. 51795 of 1982 relates to antioxidants and corrosion inhibitors for use with various polyether type synthetic oils. The tests were carried out with R-12, which does not exhibit the immiscible character of R134a.

U.S. Pat. No. 4,431,557 relates to additives used in synthetic oils. Many refrigerants are mentioned, but not tetrafluoroethane, and the patentees gave no indication of concern with miscibility of the refrigerants and the lubricants.

Japanese Patent Publication No. 179699 dated Oct. 12, 1984 teaches a lubricating oil comprising a diol. The object of the reference is to provide a lubricating oil which does not dissolve refrigerants so as to improve the compressor efficiency, with a high degree of solubility with the refrigerant being undesirable. The reference teaches that the lubrication oil is useful in refrigerators and air conditioners with R12 and monochlorodifluoromethane (known in the art as R22). Many refrigerants are mentioned but not tetrafluoroethane.

Japanese Patent Publication No. 96684 dated May 30, 1985 addresses the stability problems of refrigerants. The reference mentions chlorotrifluoroethylene low-polymer as a useful lubricant. The reference does not address the miscibility problems with R134a.

Commonly assigned U.S. Pat. No. 4,755,316 teaches a compression refrigeration composition. The refrigerant is tetrafluoroethane while the lubricant is at least one polyoxyalkylene glycol which is at least difunctional with respect to hydroxyl groups, has a molecular weight between 300 and 2,000, has a viscosity of about 25–150 centistokes at 37° C., has a viscosity index of at least 20, and is miscible in combination with the tetrafluoroethane in the range between −40° C. and at least +20° C. The reference mentions the use of additives such as viscosity adjusters including polyisobutylene, polymethacrylates, polyalkylstyrenes, naphthenic oils, alkylbenzene oils, paraffinic oils, polyesters, polyvinylchloride, and polyphosphates. The reference states that other types of high viscosity substances could be added to a low molecular weight polyoxypropylene glycol to increase the viscosity provided that the resulting mixtures had a suitable range of miscibility with the refrigerant. The reference does not teach the present composition.

Although the lubricants of commonly assigned U.S. Pat. No. 4,755,316 are miscible with R134a over a wide temperature range, it is desired to have an improved lubricant system. Such a lubricant system might be in the form of a blend of two known lubricants so as to benefit from the properties of each individual component. One requirement of such a blend is that the two lubricants form a single phase because if two phases resulted, distribution of the lubricant's components would be uneven in the various compressor parts. In this regard, we tried combining various known lubricants in order to improve the miscibility range and found that many combinations did not form a single phase.

Because it is expected that R134a will become widely used in the field of refrigeration and air-conditioning, improved lubricants which exist as a single phase and are useful with R134a over a wide miscibility range are needed in the art.

SUMMARY OF THE INVENTION

The present invention responds to the foregoing need in the art by providing single phase lubricants useful with R134a.

The present invention provides a lubricating composition comprising a single phase blend of (i) at least one polyoxyalkylene glycol which has a molecular weight between 300 and 2000, a viscosity of about 10–157 centistokes at 37° C. and a viscosity index of at least 20 and (ii) a chlorotrifluoroethylene oil having a viscosity of about 0.8–1000 centistokes at 25° C. wherein the blend is miscible in combination with tetrafluoroethane in the range between 0° C. and at least +5° C. The blend is useful in many applications including refrigeration systems. The blend has a viscosity of 10–157 centistokes at 37° C. and a viscosity index of 20–200.

The present invention also provides a composition for use in compression refrigeration. The composition comprises: (a) tetrafluoroethane; and (b) a sufficient amount to provide lubrication of a single phase blend of (i) at least one polyoxyalkylene glycol which has a molecular weight between 300 and 2000, a viscosity index of about 10–157 centistokes at 37° C., and a viscosity index of at least 20 and (ii) a chlorotrifluoroethylene oil having a viscosity of about 0.8–1000 centistokes at 25° C. The blend is miscible in combination with the tetrafluoroethane in the range between 0° C. and at least +5° C. and the composition has a viscosity of about 60 to about 120 centistokes at 37° C.

It was unexpectedly discovered that a blend of polyoxyalkylene glycol and chlorotrifluoroethylene based oil exists as a single phase. This finding is in contrast to other lubricant combinations which were tried by us and did not exhibit a single phase. The existence of a single phase is critical because in the absence of a single phase, distribution of the lubricant's components would be uneven in the various compressor parts. As such, the benefits of blending would not be realized.

Compared to the compositions of U.S. Pat. No. 4,755,316, the present compositions have a wider miscibility range. Because it was uncertain whether a single phase lubricant would form, these miscibility range results were surprising.

The present invention also provides a method for improving lubrication in compression refrigeration equipment using tetrafluoroethane as a refrigerant. The method employs as a lubricant a single phase blend of (i) at least one polyoxyalkylene glycol which is monofunctional or multifunctional with respect to hydroxy groups or is capped by alkyl groups, has a molecular weight between 300 and 2000, a viscosity of about 10–157 centistokes at 37° C., and a viscosity index of at least 20 and (ii) a chlorotrifluoroethylene oil having a viscosity of about 0.8 to about 1000 centistokes at 250° C. The term "multifunctional" includes difunctional, trifunctional and tetrafunctional. The blend is miscible in combination with the tetrafluoroethane in the range between 0° C. and at least +5° C.

Other advantages of the present invention will become apparent from the following description and appended claims.

DETAILED DESCRIPTION OF THE PREFERRED EMBODIMENTS

Refrigerants

The invention relates to the substitution of tetrafluoroethane in refrigeration compositions and preferably 1,1,1,2-tetrafluoroethane for dichlorodifluoromethane, which has been considered to present a danger to the atmospheric ozone layer. R134a has physical characteristics which allow its substitution for R-12 with only a minimum of equipment changes, although it is more expensive and not available in large quantities at the present time. Its symmetrical isomer, R134, may also be used. The effect of tetrafluoroethane on atmospheric ozone is considered to be much less than the effect of R-12, and therefore, the substitution of tetrafluoroethane for R-12 is considered probable.

Tetrafluoroethane could be blended with other refrigerants. It should be understood that only blends of tetrafluoroethane with other refrigerants which are miscible with the present lubricating blends in the range of 0° C. and at least +5° C. and have a viscosity of about 60 to about 120 centistokes at 37° C. are included.

R-12 is used in very large quantities and of the total, a substantial fraction is used for automotive air conditioning. Consequently, the investigation of the lubricants needed for use with R134a (or R134) has emphasized the requirements of automotive air conditioning since the temperature range is generally higher than other refrigeration systems, i.e., about 0° C. to 93° C. Since it has been found that R134a differs in being much less miscible with common lubricants than R-12, the substitution of refrigerants becomes more difficult.

Lubricants

R-12 is fully miscible in ordinary mineral oils and consequently, separation of the lubricants is not a problem. Although it is similar to R12, R134a is relatively immiscible in many lubricants as may be seen by reference to commonly assigned U.S. Pat. No. 4,755,316. Thus, it is necessary to find suitable lubricants which are miscible with R134a (or R134) to avoid refrigerant and lubricant separation.

It is characteristic of some refrigerant-lubricant mixtures that a temperature exists above which the lubricant separates. Since this phenomenon occurs also at some low temperatures, a limited range of temperatures within which the two fluids are miscible may occur. Ideally, this range should span the operating temperature range in which the refrigerant is to operate, but often this is not possible. It is typical of automotive air conditioning systems that a significant fraction of the circulating charge is lubricant and the refrigerant and lubricant circulate together through the system. Separation of the lubricant and refrigerant as they return to the compressor could result in erratic lubrication of the moving parts and premature failure. Other air conditioning system types usually circulate only the relatively smaller amount of lubricant which is carried by the refrigerant gas passing through the compressor and should be less sensitive to the separation problem. Especially with automotive air conditioning, separation of the relatively large amount of lubricant circulating with the refrigerant can also affect the performance of other parts of the system.

In a typical automotive air conditioning system, the temperatures at which the refrigerant is condensed originally will be about 50°-70° C. but may reach 90° C. in high ambient temperature operation. The condensation of hot refrigerant gases in the condensing heat exchanger can be affected if the exchanger is coated with lubricant preferentially so that condensation of the refrigerant occurs by contact with the lubricant film. Thereafter, the two-phase mixture of lubricant and refrigerant must pass through a pressure reduction to the low temperature stage where the refrigerant evaporates and absorbs the heat given up in cooling air and condensing moisture. If lubricant separates at the condenser, then the performance of the evaporator state can be affected if separate phases persist as the two-phase mixture passes through the pressure reduction step. As with the condenser, accumulation of lubricant on the evaporator coils can affect heat exchange efficiency. In addition, the low evaporator temperatures may result in excessive cooling of the lubricant resulting in a more viscous liquid and trapping of the lubricant in the evaporator. These problems can be avoided if the lubricant and the refrigerant are fully miscible throughout the operating temperature ranges, as was true with R-12 and mineral oil mixtures. R134a, with its limited ability to dissolve lubricants, presents a problem which must be solved.

The present invention relates to the discovery that combinations of polyoxyalkylene glycols and chlorotrifluoroethylene based oils form a single phase and are useful with R134a. These compositions are particularly useful in automobile air-conditioning systems.

The term "polyoxyalkylene glycol" as used herein refers to compounds produced by addition polymerization of alkylene oxides, initiated by a molecule having one or more active hydrogens. Commonly, these compounds have terminal hydroxyl groups. The compound may be a copolymer of two or more alkylene oxides and the copolymer may be random or block copolymer. Examples of initiators include water, alcohols, polyalcohols, glycols and amines. One or more of the terminal hydroxyl groups may be end-capped with, but not limited to, the following types of molecules: alkyl groups, branched alkyl groups, ester groups and ether groups. Preferably, the weight percentage of oxyalkylene groups in the chain is at least 80% and the remaining 20% may be other units including but not limited to polyester, polyamide and polyvinyl chloride units.

More preferably, the polyoxyalkylene glycol has the formula

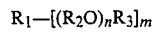

$$R_1-[(R_2O)_nR_3]_m$$

wherein $R_1$ is a residue of a compound having 1 to 8 hydroxyl groups or a hydroxyl group, $R_2$ is an alkylene moiety having 2 to 4 carbon atoms, $R_3$ is hydrogen or an alkyl group with 1 to 10 carbon atoms, and n and m are numbers such that the molecular weight of the polyoxyalkylene glycol is 300 to 2000. As such, the polyoxyalkylene glycol may be terminated by hydrogens at both ends, a hydrogen at one end and an alkyl group at the other end, or alkyl groups at both ends. The alkyl groups may be branched or straight chain.

Many polyoxyalkylene glycols are commercially available. The polyoxyalkylene glycols may be random or block polymers or copolymers of ethylene oxide, propylene oxide, butylene oxide, or other alkylene oxides. Most preferably, the polyoxyalkylene glycols are random or block copolymers of ethylene oxide and propylene oxide or a polymer of propylene oxide. The capped glycols may be formed by alkylating polyoxyalkylene glycols. Blends of polyoxyalkylene glycols having different molecular weights and hydroxyl functionalities may also be used in the present invention.

Chlorotrifluoroethylene oils having viscosities from about 0.8-1000 centistokes at 25° C. are available commercially. Preferred chlorotrifluoroethylene oils have a viscosity of about 100 to about 1,000 centistokes at 25° C.

The present lubricating blends are miscible in combination with tetrafluoroethane in the range between about 0° C. and at least about +5° C., preferably at least about +10° C., more preferably at least about +20° C., and most preferably at least about +30° C.

Preferably, the present composition has a viscosity of about 60 to about 110 centistokes at 37° C.

Preferably, the weight ratio of polyoxyalkylene glycol used to chlorotrifluoroethylene oil used is about 99:1 to about 1:99. More preferably, the weight ratio is about 10:90 to about 56:44.

Preferably, the tetrafluoroethane and blend are used in a weight ratio of about 99:1 to about 1:99, and more preferably, in a weight ratio of about 99:1 to about 50:50.

It is known that chlorotrifluoroethylene based oils may become unstable when exposed to aluminum. Thus, stabilizer is preferably added to the present lubricating blends. Useful stabilizers include phosphite esters, epoxy compounds, and organotin compounds. Preferred phosphite esters are trimethyl phosphite, triethyl phosphite, and tributyl phosphite; these phosphite esters are all available commercially. Preferred epoxy compounds are allyl glycidyl ether; 1,4-butanediol diglycidyl ether; and butylene oxide. These epoxies are all available commercially. Preferred organotin compounds are tetraethyltin, tetrabutyltin, and tetraphenyltin; these organotin compounds are all available commercially.

The range of miscibility is not the only factor to be considered when one is selecting lubricant for automotive air conditioning service (or other refrigeration applications including commercial and residential vapor compression refrigerators). Lubricating properties also must be satisfactory for the intended application. Practically, this means that for automotive air conditioning, the viscosity of the lubricant will be about 10–157 centistokes, preferably about 100 centistokes (CS) at 37° C. with a viscosity index of at least 20 in order that the lubricant is sufficiently viscous at high temperatures to lubricate while remaining sufficiently fluid to circulate around the refrigeration circuit at low temperatures. The range of viscosity may also be expressed as about 3–34 CS at 98.9° C. Other factors which should be considered in selecting lubricants are compatibility, lubricity, safety, and the like.

Additives which may be used to enhance performance include (1) extreme pressure and antiwear additives, (2) oxidation improvers, (3) corrosion inhibitors, (4) viscosity index improvers, (5) pour and floc point depressants, (6) detergent, and (7) anti foaming agents. Typical members of these classes are listed in TABLE 1 below:

TABLE 1

| Class Additive | Typical Members of the Class |
| --- | --- |
| 1. Extreme Pressure and antiwear | phosphates, phosphate esters esters (bicresyl phosphate), phosphites, thiophosphates (zinc diorganodithiophosphates), chlorinated waxes, sulfurized fats and olefins, organic lead compounds, fatty acids, molybdenum complexes, halogen substituted organosilicon compounds, borates, organic esters, halogen substituted phosphorous compounds, sulfurized Diels Alder adducts, organic sulfides, compounds containing chlorine and sulfur, metal salts of organic acids. |
| 2. Oxidation improvers | sterically hindered phenols (BHT), aromatic amines, dithiophosphates, phosphites, sulfides, metal salts of dithio acids. |
| 3. Corrosion Inhibitors | organic acids, organic amines, organic phosphates, organic alcohols, metal sulfonates, organic phosphites. |
| 4. Viscosity index improvers | polyisobutylene, polymethacrylate, polyalkylstyrenes. |
| 5. Pour Point and/or floc point depressants | polymethacrylate ethylene-vinyl acetate copolymers, succinamic acid-olefin copolymers, ethylene-alpha olefin copolymers, Freidel-Crafts condensation products of wax with naphthalene or phenols. |
| 6. Detergents | sulfonates, long-chain alkyl substituted aromatic sulfonic acids, phosphonates, thiophosphonates, phenolates, metal salts of alkyl phenols, alkyl sulfides, alkylphenol-aldehyde condensation products, metal salts of substituted salicylates, N—substituted oligomers or polymers from the reaction products of unsaturated anhydrides and amines, copolymers of methacrylates with N—substituted compounds such as N—vinyl pyrrolidone or dimethylaminoethyl methacrylate, copolymers which incorporate polyester linkages such as vinyl acetate-maleic anhydride copolymers. |
| 7. Anti-Foaming | silicon polymers. |

The present invention is more fully illustrated by the following non-limiting Examples.

COMPARATIVES 1–6

The following lubricant blends were made by us in an attempt to prepare a single phase. The determination as to the formation of a single phase was by visual observation. A single phase did not form for any Comparative.

TABLE 2

| COMP. | LUBRICANT A | LUBRICANT B |
| --- | --- | --- |
| 1 | P1200 | KRYTOX143AB |
| 2 | P1200 | FS1265 |
| 3 | KRYTOX143AB | FS1265 |
| 4 | MINERAL OIL | FS1265 |
| 5 | MINERAL OIL | KRYTOX143AB |
| 6 | P1200 | MINERAL OIL |

P1200 has a molecular weight of 1200 and is available commercially from Dow Chemical.

Krytox143AB is a homopolymer of hexafluoropropylene epoxide, has a molecular weight of 3700 and is available commercially from DuPont.

FS1265 is methyl trifluoropropyl siloxane and is available commercially from Dow-Corning.

As such, these two phase systems are not useful as lubricants.

COMPARATIVES 7-8

For Comparative purposes, the properties of chlorotrifluoroethylene oils are set forth in Table 3 below.

TABLE 3

| COMP. | CTFE OIL | VISC. AT 37° C. (CS) | WT. % R 134a | MISC. (° C.) |
|---|---|---|---|---|
| 7 | H1000N | 1000 | 84 | 17 to >77 |
| 8 | HALOVAC 100 | 100 | 84 | −15.8 to >77 |

H1000N has the repeating unit, $-(CF_2CFCl)_n-$ and is available commercially from Halocarbon Products.

Halovac 100 has the repeating unit, $-(CF_2CFCl)_n-$ and is available commercially from Halocarbon Products.

COMPARATIVES 9-14

For Comparative purposes, the properties of polyoxyalkylene glycols are set forth in Table 4 below.

TABLE 4

| COMP. | GLYCOL | Visc. At 37° C. (CS) | Wt. % R134a | Misc. (° C.) |
|---|---|---|---|---|
| 9 | LB165 | 35.4 | 84 | −63 to 75.4 |
| 10 | LB65 | 11.75 | 84 | −63 to >80 |
| 11 | P425 | 33.0 | 84 | −60 to >70 |
| 12 | P725 | 64.0 | 84 | −63 to 78.43 |
| 13 | P1200 | 90.0 | 84 | −60 to 50 |
| 14 | P2000 | 157.0 | 84 | −60 to 13 |

LB165 is $C_4H_9-[CH_2CH(CH_3)O]_nH$, has a molecular weight of 740 and is available commercially from Union Carbide.

LB65 is $C_4H_9-[CH_2CH(CH_3)O]_nH$, has a molecular weight of 340 and is available commercially from Union Carbide.

P425 is $HO[CH_2CH[CH_3]O]_nH$, has a molecular weight of 425 and is available commercially from Dow Chemical.

P725 is $HO[CH_2CH[CH_3]O]_nH$, has a molecular weight of 725 and is available commercially from Union Carbide.

P1200 is $HO[CH_2CH[CH_3]O]_nH$, has a molecular weight of 1200 and is available commercialy from Dow Chemical.

P2000 is $HO[CH_2CH[CH_3]O]_nH$, has a molecular weight of 2000 and is available commercially from Dow Chemical.

EXAMPLES 1-7

Blends of the foregoing chlorotrifluoroethylene oils and polyoxyalkylene glycols as set forth in Table 4 below were prepared. Each blend exhibited a single phase.

The miscibility of the various lubricant blends was determined by combining them with R134a in glass tubes and observing the results when the tubes were maintained at a series of preselected temperatures. Each tube was filled with the desired amount of blend and then R134a was added while the blend was frozen with liquid nitrogen. The tube was then sealed and immersed in a thermostat-controlled bath. After the temperature had equilibrated, the miscibility of the blend and R134a was determined by visual observation. The results of the tests are given in TABLE 5 below; CTFE stands for chlorotrifluoroethylene oil while PG stands for polyoxyalkylene glycols in TABLE 5.

TABLE 5

| EX | CTFE/PG | VISC AT 37° C. (CS) | WT. % R134a | MISC. (° C.) |
|---|---|---|---|---|
| 1 | H1000N/LB165 (62/38) | 90 | 84.5 | −19.9 TO >80 |
| 2 | H1000N/LB65 (82/18) | 90 | 84.9 | −4.9 TO >75 |
| 3 | H1000N/P425 (62/38) | 90 | 84.2 | −17.8 TO >80 |
| 4 | H1000N/P725 (44/56) | 85 | 84.3 | −28.4 TO >80 |
| 5 | HALOVAC 100/P425 (80/20) | — | 84 | −36.0 TO >80.0 |
| 6 | HALOVAC 100/P425 (90/10) | 69.2 | 50 | −21.0 TO >80 |
| 7 | HALOVAC 100/P425 (90/10) | 69.2 | 84.6 | −26.0 TO >80 |

It should be noted that each tube had a pressure rating of 400 pounds on it. If the pressure had been increased, the tubes may have exploded. As such for safety reasons, the maximum pressure used was 400 pounds. In order to keep the pressure in the tubes below 400 pounds, the maximum temperature used was 80° C. As such, the lower critical solution temperature (LCST) may be indicated to be above a certain value rather than an actual value.

As Table 5 shows, the present compositions are completely miscible in the high temperature range and also remain miscible well below 0° C. As shown in the data of Table 5, the present blends have unexpectedly higher lower critical solution temperatures (LCST) at high viscosities. This unexpectedly superior property provides better operations at high temperatures due to improved miscibility.

EXAMPLES 8-14

Other blends of the foregoing chlorotrifluoroethylene oils and polyoxyalkylene glycols are prepared in the weight ratios as set forth in Table 6. The blends are then combined with R134a in the weight ratio as set forth in Table 6.

TABLE 6

| Ex | CTFE/PG | WT. % R134a |
|---|---|---|
| 8 | Halocarbon 0.8/LB165 (40/60) | 10 |
| 9 | Halocarbon 1.8/LB65 (35/65) | 15 |
| 10 | Halocarbon 4.2/P425 (30/70) | 20 |
| 11 | Halocarbon 6.3/P725 (25/75) | 25 |
| 12 | Halocarbon 27/P1200 (20/80) | 30 |
| 13 | Halocarbon 56/P2000 (15/85) | 35 |
| 14 | Halocarbon 95/LB165 (10/90) | 40 |
| 15 | Halocarbon 700/LB65 (10/90) | 45 |

Halocarbon 0.8 has a viscosity of 0.8 cs at 37.8° C. and is available commercially from Halocarbon Products.

Halocarbon 1.8 has a viscosity of 1.8 cs at 37.8° C. and is available commercially from Halocarbon Products.

Halocarbon 4.2 has a viscosity of 4.2 cs at 37.8° C. and is available commercially from Halocarbon Products.

Halocarbon 6.3 has a viscosity of 6.3 cs at 37.8° C. and is available commercially from Halocarbon Products.

Halocarbon 27 has a viscosity of 27 cs at 37.8° C. and is available commercially from Halocarbon Products.

Halocarbon 56 has a viscosity of 56 cs at 37.8° C. and is available commercially from Halocarbon Products.

Halocarbon 95 has a viscosity of 95 cs at 37.8° C. and is available commercially from Halocarbon Products.

Halocarbon 700 has a viscosity of 700 cs at 37.8° C. and is available commercially from Halocarbon Products.

Having described the invention in detail and by reference to preferred embodiment thereof, it will be apparent that modifications and variations are possible without departing from the scope of the invention defined in the appended claims.

What is claimed is:

1. A lubricating composition comprising a single phase blend of (i) at least one polyoxyalkylene glycol which has a molecular weight between 300 and 2000, a viscosity of about 10–157 centistokes at 37° C. and a viscosity index of at least 20 and (ii) a chlorotrifluoroethylene oil having a viscosity of about 0.8–1000 centistokes at 25° C. wherein said blend is miscible in combination with tetrafluoroethane in the range of 0° C. to at least +5° C.

2. The lubricating composition of claim 1 wherein the weight ratio of said polyoxyalkylene glycol to said polymeric chlorotrifluoroethylene oil is about 10:20 to about 56:44.

3. The lubricating composition of claim 1 wherein said polyoxyalkylene glycol is a random or block copolymer of ethylene oxide and propylene oxide.

4. The lubricating composition of claim 1 wherein said polyoxyalkylene glycol is a polymer of propylene oxide.

5. A composition for use in compression refrigeration comprising:
   (a) tetrafluoroethane; and
   (b) a sufficient amount to provide lubrication of a single phase blend of (i) at least one polyoxyalkylene glycol which has a molecular weight between 300 and 2000, a viscosity of about 10–157 centistokes at 37° C., and a viscosity index of at least 20 and (ii) a chlorotrifluoroethylene oil having a viscosity of about 0.8–1000 centistokes at 25° C. wherein said blend is miscible in combination with said tetrafluoroethane in the range between 0° C. and at least +5° C. and said composition has a viscosity of about 60 to about 120 centistokes at 37° C.

6. The composition of claim 5 wherein said tetrafluoroethane is 1,1,1,2-tetrafluoroethane.

7. The composition of claim 5 wherein the weight ratio of said polyoxyalkylene glycol to said chlorotrifluoroethylene based oil is about 10:90 to about 56:44.

8. The composition of claim 5 wherein the weight ratio of said tetrafluoroethane to said blend is about 99:1 to about 50:50.

9. The composition of claim 5 wherein said polyoxyalkylene glycol has at least 80 percent by weight oxyalkylene groups.

10. The composition of claim 5 wherein said polyoxyalkylene glycol has the formula $$R_1[(R_2O)_nR_3]_m$$

wherein $R_1$ is a residue of a compound having 1 to 8 hydroxyl groups or a hydroxyl group, $R_2$ is an alkylene moiety having 2 to 4 carbon atoms, $R_3$ is hydrogen or an alkyl group with 1 to 10 carbon atoms, and n and m are numbers such that the molecular weight of said polyoxyalkylene glycol is 300 to 2000.

11. The composition of claim 5 wherein said polyoxyalkylene glycol is a random or block copolymer of ethylene oxide and propylene oxide.

12. The composition of claim 5 wherein said polyoxyalkylene glycol is a polymer of propylene oxide.

13. The composition of claim 5 wherein the miscible range is between 0° C. and at least +10° C.

14. The composition of claim 5 wherein the miscible range is between 0° C. and at least +20° C.

15. A method for improving lubrication in compression refrigeration equipment using tetrafluoroethane as a refrigerant consisting of employing as a lubricant a single phase blend of (i) at least one polyalkylene glycol which has a molecular weight between 300 and 2000, a viscosity of about 10–157 centistokes at 37° C., and a viscosity index of at least 20 and (ii) a chlorotrifluoroethylene oil having a viscosity of about 0.8 to about 1000 centistokes at 25° C. wherein said blend is miscible in combination with said tetrafluoroethane in the range between 0° C. and at least +5° C.

16. The method of claim 15 wherein said tetrafluoroethane is 1,1,1,2-tetrafluoroethane.

17. The method of claim 15 wherein the weight ratio of said polyoxyalkylene glycol to said chlorotrifluoroethylene based oil is about 10:90 to about 56:44.

18. The method of claim 15 wherein the weight ratio of said tetrafluoroethane to said blend is about 99:1 to about 50:50.

19. The method of claim 15 wherein said polyoxyalkylene glycol has at least 80 percent by weight oxyalkylene glycols.

20. The method of claim 15 wherein said polyoxyalkylene glycol has the formula $$R_1-[(R_2O)_nR_3]_m.$$

wherein $R_1$ is a residue of a compound having 1 to 8 hydroxyl groups or a hydroxyl group, $R_2$ is an alkylene moiety having 2 to 4 carbon atoms, $R_3$ is hydrogen or alkyl group with 1 to 10 carbon atoms, and n and m are numbers such that the molecular weight of said polyoxyalkylene glycol is 300 to 2000.

21. The method of claim 15 wherein said polyoxyalkylene glycol is a copolymer of ethylene oxide and propylene oxide.

22. The method of claim 15 wherein said polyoxyalkylene glycol is a polymer of propylene oxide.

* * * * *

UNITED STATES PATENT AND TRADEMARK OFFICE
CERTIFICATE OF CORRECTION

PATENT NO.    : 4,900,463
DATED         : February 13, 1990
INVENTOR(S)   : R. Thomas et al.

It is certified that error appears in the above-identified patent and that said Letters Patent is hereby corrected as shown below:

In the Claims

Column 11, claim 2, line 29 delete "10:20"; substitute therefor --10:90--.

Signed and Sealed this

Twenty-second Day of January, 1991

Attest:

HARRY F. MANBECK, JR.

*Attesting Officer*       *Commissioner of Patents and Trademarks*